(12) United States Patent
Sheikh (10) Patent No.: US 8,914,039 B1
(45) Date of Patent: *Dec. 16, 2014

(54) INTERPERSONAL COMMUNICATION AND INTERACTIVE INFORMATION SYSTEM

(76) Inventor: Babak Sheikh, Weston, FL (US)

( * ) Notice: Subject to any disclaimer, the term of this patent is extended or adjusted under 35 U.S.C. 154(b) by 409 days.

This patent is subject to a terminal disclaimer.

(21) Appl. No.: 13/471,122

(22) Filed: May 14, 2012

Related U.S. Application Data (63) Continuation-in-part of application No. 12/389,706, filed on Feb. 20, 2009, now Pat. No. 8,180,369.

(51) Int. Cl.
*H04W 24/00* (2009.01)

(52) U.S. Cl.
USPC ............... 455/456.1; 455/456.2; 455/456.3; 455/456.5; 455/456.6; 455/414.1; 455/566; 455/466; 455/435.1; 455/435.2

(58) Field of Classification Search
CPC ..................................................... H04W 24/00
USPC ............... 455/456.1–456.6, 414.1, 446, 566, 455/435.1–435.2
See application file for complete search history.

(56) References Cited

U.S. PATENT DOCUMENTS

| | | |
|---|---|---|
| 5,528,248 A | 6/1996 | Steiner et al. |
| 6,091,956 A | 7/2000 | Hollenberg |
| 6,813,501 B2 | 11/2004 | Kinnunen et al. |
| 7,013,149 B2 | 3/2006 | Vetro et al. |
| 7,213,048 B1 | 5/2007 | Parupudi et al. |
| 7,239,878 B2 | 7/2007 | Bazin et al. |
| 7,469,139 B2 | 12/2008 | Van De Groenendaal |
| 7,620,404 B2 | 11/2009 | Chesnais et al. |
| 7,787,887 B2 | 8/2010 | Gupta et al. |
| 7,848,765 B2 | 12/2010 | Phillips et al. |
| 2005/0038876 A1 | 2/2005 | Chaudhuri |
| 2006/0270421 A1 | 11/2006 | Phillips et al. |
| 2007/0060173 A1 | 3/2007 | Ramer et al. |
| 2007/0264968 A1 | 11/2007 | Frank et al. |
| 2007/0264969 A1 | 11/2007 | Frank et al. |
| 2008/0167806 A1 | 7/2008 | Wheeler et al. |
| 2009/0233623 A1 | 9/2009 | Johnson |

*Primary Examiner* — Michael T Vu
(74) *Attorney, Agent, or Firm* — Malin Haley DiMaggio & Bowen, P.A.

(57) ABSTRACT

An interpersonal communication and an interactive information system, where a user can access a wireless local area network connected to a cloud computing service from any compatible mobile device and obtain information specific to the user's location and communicate with other mobile devices in the user's location through the wireless local area network.

13 Claims, 7 Drawing Sheets

INTERPERSONAL COMMUNICATION AND INTERACTIVE INFORMATION SYSTEM

CROSS REFERENCE TO RELATED APPLICATIONS

This application is a continuation-in-part of co-pending U.S. patent application Ser. No. 12/389,706, filed Feb. 20, 2009.

BACKGROUND OF THE INVENTION

1. Field of the Invention

This invention relates generally to an interpersonal communication and an interactive information system, and specifically to a system that allows a user to use a mobile device to interactively acquire real time information about a facility in which the device is presently located and communicate with other devices at the facility. The system can employ cloud computing.

2. Description of Related Art

Handheld communication devices have become more and more prevalent in the day to day lives of people in our society. In addition, the reliability, capability, and convenience of such devices has dramatically improved. What began as car phones and bulky pagers have evolved into devices with ever increasing mobility, a constant stream of new features, as well as dramatically increased reliability and battery life, all while the size of the devices has decreased. Today, it is common to see extremely powerful handheld devices that are able to send and receive calls, messages, and emails, utilize GPS systems, and perform many computing functions such as PDA functions, word processing, and web surfing, and see these devices fit in the palm of someone's hand.

Similarly, the spread of wireless communications, including cell phone communication networks, wireless local area networks (WLAN or Wi-Fi), and the Bluetooth protocol has greatly influenced the communicative and informational potential in people's lives. The growth of mobile communication and data based services has made constant contact with other people and immediate access to all types of data commonplace in many people's lives. Moreover, it is not uncommon for a home, a small business, a mall, or even a city to broadcast its own WLAN, providing general access to the Internet for all those who can access the network. Further, as such technologies become more powerful, efficient and more reliable, their growth and influence on society will continue to grow.

While the Internet alone can seemingly provide an endless access to communication and information services in general, there remains a need for more specific and localized communication and information services. This need is met in some respects by intranets and other local networks. These types of networks often provide detailed information, keep the information more up to date, and pertain more to specialized or localized needs. Intranets are often used by businesses and by universities to attempt to meet this need.

However, with the promulgation of wireless technology, these local networks could be more effectively used in existing settings and also used in additional settings. Many commercial settings could greatly benefit from allowing visitors to access a locally provided, wireless network through the patrons' own handheld device and providing relevant content and various services to enhance the visitor's experience. Therefore, what is needed is a communication and information system that can utilize a WLAN to provide localize informational services and localized communicative services to users of the system on the users' own compatible handheld device.

SUMMARY OF THE INVENTION

Applicant's communication and information system described herein is embodied in the Interactive Communication and Information Service ("ICIS") software developed by applicant and installed on a computer host and mobile devices used herein. The ICIS software comprises an ICIS host software and an ICIS user software.

A facility offering the ICIS to its visitors must provide a computer host and a wireless local area network. The computer host is ideally a server or other high powered computer and must have the ICIS host software installed on it. The wireless local area network is connected to the computer host and is needed to transmit the locally hosted data transmission signal that enables the transmission of electronic data wirelessly between mobile devices. This data transmission signal is a WLAN (or Wi-Fi network) or a Bluetooth protocol network.

In an alternate embodiment of the invention, cloud Internet-based computer services could be used. The facility computer host at the facility could be connected using the Internet to a cloud based computer service. A cloud computer service provider has a server that could act as the computer host off-site and communicate with a local host facility computer or other cloud display device using the Internet. The facility that uses ICIS thus engages a cloud-based service provider to store and maintain the data necessary for ICIS, including the necessary software programs to run ICIS. Thus, the host computer at the facility will be connected to the Internet and to the cloud computer system provider server that maintains ICIS database information and ICIS software. The purpose of this arrangement is to take advantage of the benefits of cloud computing and to reduce the system requirements of the host computer at the local store facilities.

A mobile device is required to utilize the ICIS. The mobile device must include a visual display and be able to transmit and receive data over a wireless network. Many modern cell phones are equipped to use the ICIS. To access the ICIS, the mobile device must be positioned within range of the transmission signal so that the mobile device is able to transmit and receive data over the transmission signal. The mobile device must also have the ICIS user software installed to log into the ICIS and utilize the services. The ICIS user software may be downloaded and installed prior to entering an ICIS equipped facility or downloaded and installed upon entry into an ICIS equipped facility. A local computer is not required. The cloud based server can be accessed by the store server or facility from anywhere.

The ICIS user software comprises application programs for informational and communicative services, each of which can be accessed through a navigable main menu, and a graphical user interface. The ICIS host software comprises a graphical user interface, local auxiliary data comprising facility specific maps, new, events, and other pertinent data, data entry software for entry and update of local auxiliary data, a search engine for searching the local auxiliary data, an application program for creating and hosting private chat rooms, and the ICIS user software for download by mobile devices.

When a mobile device that does not have the ICIS user software installed enters a facility with the ICIS and seeks to accesses the ICIS signal, it must first accept the applicable terms and conditions, create a personal identification number ("PIN"), and download and install the ICIS user software.

The ICIS user software stores the PIN and uses it in each subsequent login attempt to verify the login attempt. When a mobile device that has the ICIS user software installed accesses first begins accessing the ICIS signal in an ICIS enabled facility, it must simply enter the PIN previously created. The ICIS host uses the mobile device's PIN as well as the mobile device's phone number or email address to uniquely identify the mobile device within the system.

As soon as a mobile device is logged on to the ICIS, the transmission signal transmits local auxiliary data to the mobile device. The local auxiliary data is facility specific data that enables the ICIS user software to provide facility specific maps, news, events, and other relevant data that the host facility has chose to provide. The ICIS user software uses this information to provide an interactive local news and events service, an interactive map service, and an interactive search engine service.

Logging on to the ICIS also enables a mobile device to access an interpersonal communication service. The interpersonal communication service allows a first mobile device that is logged into a facility's ICIS to be visible to any second mobile device that is logged onto the same facility's if the first mobile device's contact information (phone number or email address) stored in the phone book or contacts section of the second mobile device. Any first mobile device that is visible to a second mobile device can be invited to and enter into a private chat room to communicate through that facility's ICIS enabled network. This should be voluntary.

The ICIS provides additional functionality for mobile devices which have GPS service. When a mobile device has an active GPS receiver, the interactive map service uses the location information to overlay the exact location of the mobile device onto the facility map. In addition, when a mobile device has an active GPS receiver, ICIS user software periodically transmits the exact location of the mobile device (along with the mobile device's contact information) to the ICIS computer host for use in conjunction with the interpersonal communication service. The interpersonal communication service uses the GPS positioning information to overlay the location information of all contacts saved on a mobile device onto a facility map. The system can employ local GPS and differential GPS and regional and internal GPS for determining the location of the user and the objects in the local surroundings.

In accordance with these and other objects which will become apparent hereinafter, the instant invention will now be described with particular reference to the accompanying drawings.

DETAILED DESCRIPTION OF PREFERRED EMBODIMENT

Figure 1:
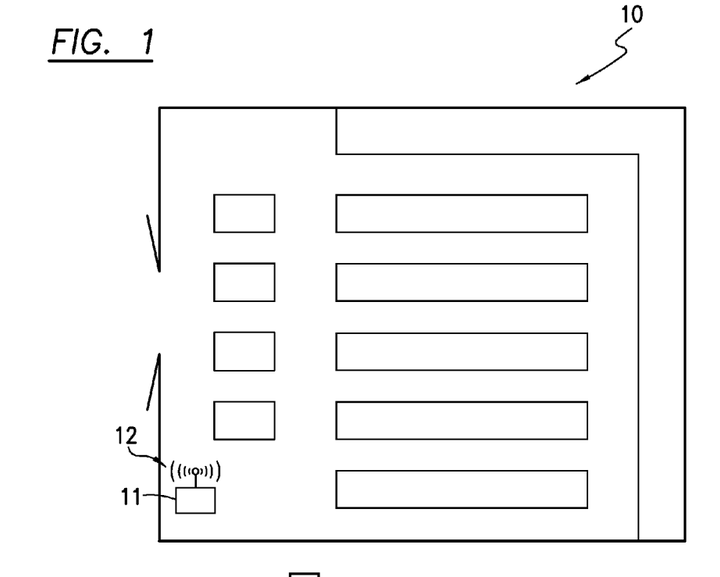
FIG. 1 shows a top plan view of a shopping center with the ICIS system installed.

Referring now to the drawings, and in particular, FIG. 1, the ICIS is shown in a defined environment. Within the facility 10, the ICIS comprises a computer host 11, which is a server or other high powered computer and a wireless router 12, which broadcasts a data transmission signal that can be accessed anywhere within the facility 10. The host 11 has the ICIS host software loaded on it, which comprises a graphical user interface, local auxiliary data comprising facility specific maps, new, events, and other pertinent data, data entry software for entry and update of local auxiliary data, a search engine for searching the local auxiliary data, an application program for creating and hosting private chat rooms, and the ICIS user software for download by mobile devices.

Figures 2, 3:
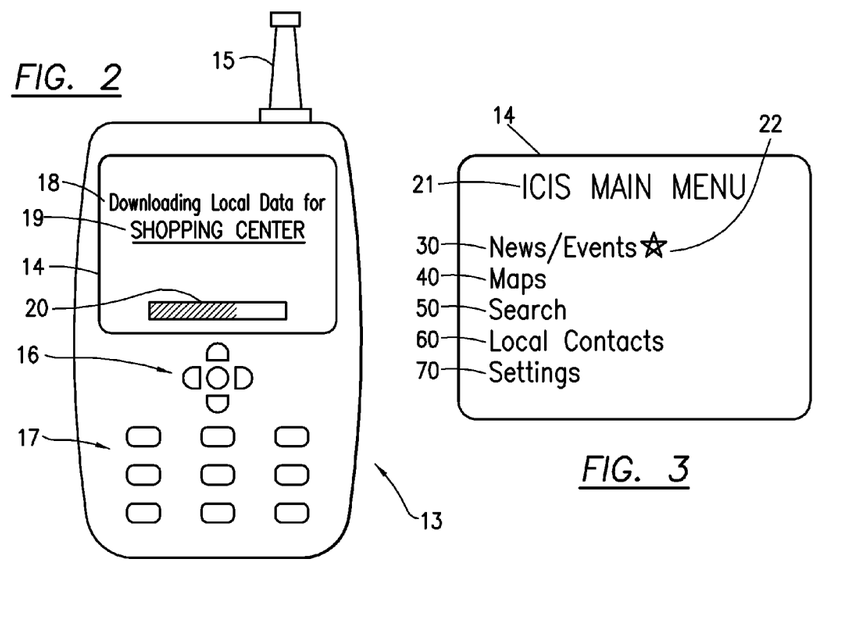
FIG. 2 shows a front plan view of a cell phone having Wi-Fi access that includes the ICIS user software described herein.
FIG. 3 shows a front plan view of the screen of a cell phone having Wi-Fi access that includes the ICIS user software described herein.

Referring now to FIG. 2, a mobile device that has just logged on to the ICIS is shown. The cell phone handset 13 is complete with all of the necessary components of the ICIS, including a visual display screen 14, a Wi-Fi compatible antenna 15, and a manual input. The manual input for this handset 13 comprises a directional pad 16 and a number pad 17. In an alternative embodiment, a handset 13 could lack the directional pad 16 or have the directional pad 16 integrated into the keypad 17. In addition, in an alternative embodiment, other types of mobile devices could be used, including but not limited to a PDA device or a mobile computer, provided the mobile device also contained a visual display, a Wi-Fi compatible antenna, and a manual input. Typically, the ICIS will receive its directional and selective inputs through the directional pad 16 or a keypad 17. However, on a mobile device where the screen 14 is a touch screen or otherwise able to receive input directly through user contact with the surface of the screen 14, all available selections will recognize inputs directly from the screen.

In the screen 14 of the handset 13, the ICIS is shown downloading the local auxiliary data for Shopping Center. The download of auxiliary data occurs in the start up phase of ICIS user software, or when a user first accesses ICIS at a particular location. ICIS user software that was already preloaded onto the handset 13 will use the local auxiliary data to customize and provide up to date information for the ICIS for whatever location that is providing the ICIS and the local auxiliary data. In the screen shot shown on the screen 14, the ICIS provides a status description 18, which displays what task the ICIS is current performing. The text of the status description 18 will differ depending on what task is being performed. For example, ICIS will provide a status description 18 while performing other tasks, such as "Loading Local Map" and "Performing Search." In such cases, the text of status description 18 will reflect what task is being performed.

The location description 19 underneath the status description 18 will specify the specific location in which the ICIS is operating. As the location providing the ICIS can vary, the location description 19 will differ depending on where the user is accessing the ICIS. FIG. 2 shows the ICIS being accessed by a user in "Shopping Mall." However, if the ICIS were to be accessed at "Movie Theater," "Museum," or "Ski Slope," the text of the location description would reflect the actual location. The progress bar 20 provides a visual representation of current progress the mobile device has made in performing the task identified in the status description 18. In FIG. 2, the progress bar 20 reflects progress in downloading the local auxiliary data.

Referring now to FIG. 3, once the download of local auxiliary data has completed, the ICIS user software will briefly integrate the data and then open the ICIS Main Menu page 21, shown here on the screen 14. The ICIS Main Menu page 21 lists the services that are available in the ICIS. The default services provided comprise a local news and events service, available under the News/Events link 30, a local map service, available under the Maps link 40, a local search service, available under the Search link 50, and an interpersonal communication service, available under the Local Contacts link 60. Whenever a service has new or recently updated information, the link will be starred 22. The basis for each service is coded into the ICIS user software that is installed on the mobile device, however, the location data that each service uses to enable the location specific features are found in the auxiliary local data download. The ICS Main Menu page 21 also provides access to a settings screen, available under the Settings link 70. The settings screen is where a user can exit the ICIS or perform maintenance functions on the local copy of the ICIS, including downloading a new copy of the ICIS user software or re-downloading the local auxiliary data.

Figure 4:
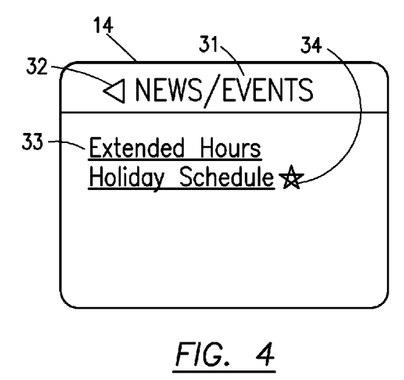
FIG. 4 shows a front plan view of the screen of a cell phone having Wi-Fi access that includes the ICIS user software described herein.

Referring now to FIG. 4, the News and Events page 31 is shown on the screen 14. A back navigator button 32 allows a user to navigate from the News and Events page 31 to the ICIS Main Menu page 21. The ICIS provider can input and broadcast various messages and scheduling announcements in this section by entering the information into the ICIS host system. Such information will be downloaded as part of the local auxiliary data and will be accessible through the link 33 relevant to the message's topic. In FIG. 4, the user could access a message about extended hours or about the holiday schedule by selecting the corresponding link on the News and Events page 31. Any link that has new or recently updated information will have a star 34 next to it.

Figure 5:
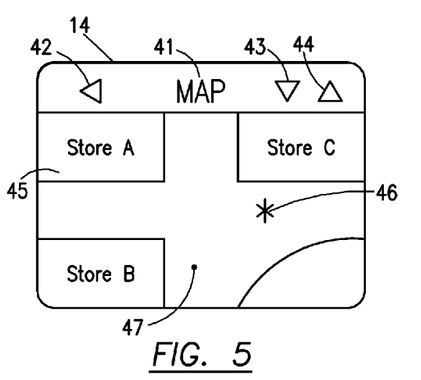
FIG. 5 shows a front plan view of the screen of a cell phone having Wi-Fi access that includes the ICIS user software described herein.

Referring now to FIG. 5, the Map page 41 is shown on the screen 14. A back navigator button 42 allows a user to navigate from the Map page 41 to the ICIS Main Menu page 21. Typically, the Map page 41 will displace a map of the ICIS provider's location. This map is downloaded as part of the local auxiliary data download and therefore is specific to the location in which the ICIS is being accessed. A zoom in button 43 and zoom out button 44 are provided to allow the user to manipulate the zoom of the map. Depending on the level of detail provided by the ICIS provider and the zoom, physical features within the location, such as a store in a shopping center 45, will be visible in the map. In addition, if the handset 13 is equipped with GPS, the map will provide additional functionality in that it will provide the user's position 46 in real time by overlaying the location of the handset 13 onto the map. If any of the user's contacts are present in the location and have a handset 13 equipped with GPS, the map will provide the contact's position 47 in real time by overlaying the location of the handset 13 onto the map.

Figure 6:
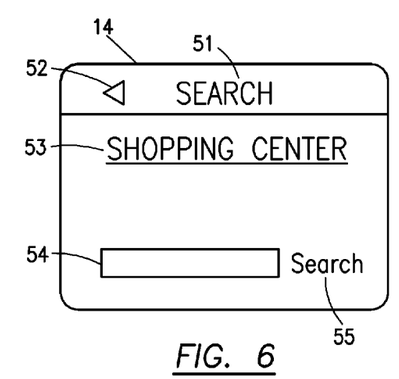
FIG. 6 shows a front plan view of the screen of a cell phone having Wi-Fi access that includes the ICIS user software described herein.

Referring now to FIG. 6, the Search page 51 is shown on the screen 14. A back navigator button 52 allows a user to navigate from the Search page 51 to the ICIS Main Menu page 21. The Search service provides the user with the ability to search locally for stores, products or services using keywords and phrases. A user looking for a particular store or item can enter the store name or the item name and the Search service performs the search by accessing the search engine found in the host computer 11 and displaying the results on the screen 14 (not shown). The location name 53 is displayed prominently on the Search page 51 and the text box 54 is positioned under the location name 53. The Search is initiated by entering the keyword or phrase into the text box 54 and selecting the Search link 55.

Figure 7:
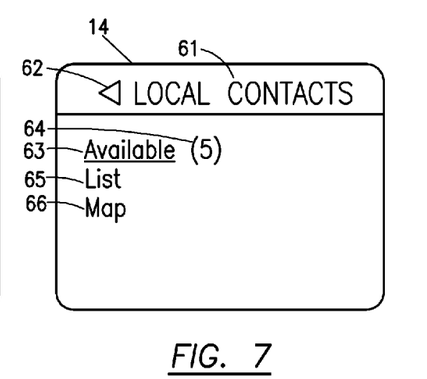
FIG. 7 shows a front plan view of the screen of a cell phone having Wi-Fi access that includes the ICIS user software described herein.

Referring now to FIG. 7, the Local Contacts page 61 is shown on the screen 14. A back navigator button 52 allows a user to navigate from the Local Contacts page 61 to the ICIS Main Menu page 21. The Local Contacts page 61 provides a list of all of the contacts whose information is stored on the user's handset 13 that are currently accessing in to the same ICIS host. The contacts are identified by matching the information such as phone number and email address to that of mobile devices that are currently accessing the ICIS host. The user's contacts that are accessing the same ICIS host are placed in the Available 63 category. The number of contacts that are in the Available category at a given time is reflected in a contact tally 64. The ICIS allows the user to view the available contacts in list form by selecting the List link 65. In addition, for any contact that is using a mobile device that includes GPS service, the Map link 66 will all the user to view such contacts on a map of the location. The map will be similar to the map found on the Map page 41.

The Local Contacts page is also where a user can initiate the interpersonal communication service. The interpersonal communication service allows a user to communication with the user's contacts who are accessing the same ICIS host computer. When viewing available contacts through the List link 65 (not shown), a user can select an available contact and invite the available contact to join a chat room. The chat rooms are hosted on the local ICIS host computer and allow handsets 13 that are accessing the same ICIS host computer to communicate through the local Wi-Fi connection and in a manner that is not dependant on the user having access to cell phone antenna signals or other non local communication service providers.

A setting in which the ICIS can be particularly useful is a ski slope. In a ski slope setting, the ICIS will allow the proprietor the ability to post relevant news items such as slope closings or slope openings, provide a map detailing the location and difficulty of the different slopes, and allow the user to perform keyword searches in order to gather all information specific to a given keyword. In addition, the patron using the ICIS could communicate with friends or family while located anywhere on the ski slope that was within range of the ICIS data transmission signal. Advantageously, this allows the user to maintain communications whether or not the ski slope location is within range of a cell phone tower. Moreover, for patrons using the ICIS that have a GPS enabled mobile device, the ICIS will greatly assist these GPS enabled patrons locate friends and family who are also present on the ski slopes.

The present invention can be very useful in selecting the correct slope to ski on using a locally generated slope map that clearly delineates the degree of difficulty of each slope available to the user from green to black diamond indications on the slope map generated on the user's screen.

Similarly, the ICIS is useful in a museum setting, such as an art museum. In such a setting, the art museum would be able to provide patrons using the ICIS with routine information such as special exhibits or emergency information such as lost child alerts. In addition, a detailed map of the entire museum and additional information and resources can be made available through keyword searches. The interpersonal communication system provides a very efficient means of allowing large or small groups to stay together and to remain in close contact, especially because often time an indoor museum setting does not provide access to regular cell phone signals.

The museum can have interactive displays at each painting or sculpture exhibit that transmits information while the user is standing in front of a specific exhibit concerning the history or description of the exhibit. The user can also use the mobile device to locate a specific exhibit in the museum with a locally generated map of the museum to find a desired exhibit.

Figure 8:
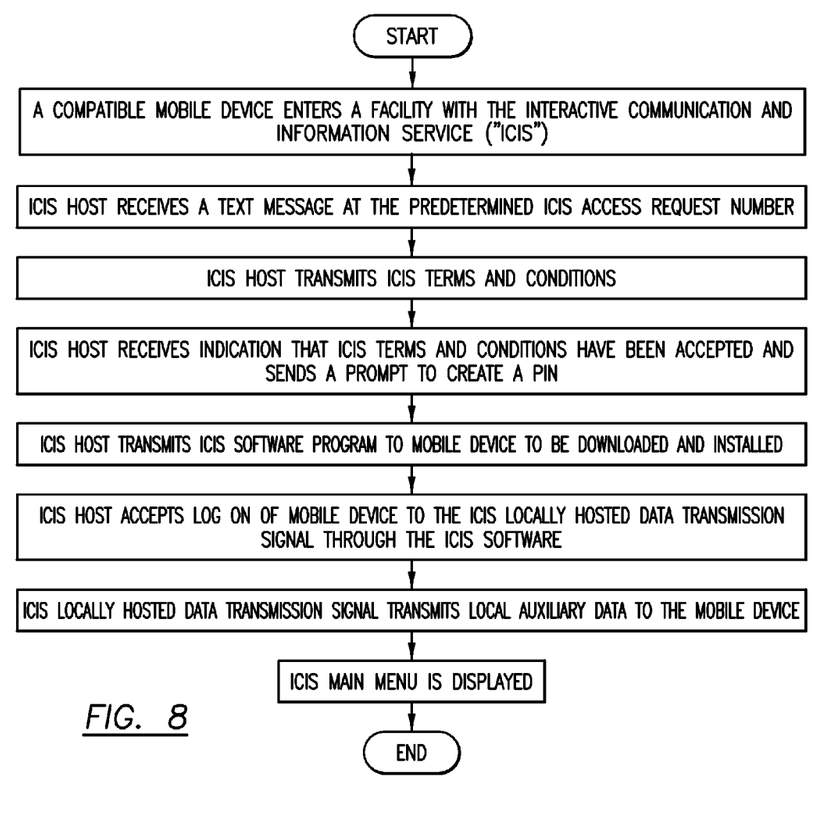
FIG. 8 shows a flow chart showing a process of accessing the ICIS for the first time.

Referring now to FIG. 8, the method for which a user registers and initially accesses the ICIS is detailed. When a mobile device that is able to transmit and receive information on a Wi-Fi network enters a facility with ICIS, the mobile device must indicate to the ICIS host computer that it would like access to the network. This can be done by sending a text message to the ICIS host computer at a number specified within the host location or by simply attempting to access the ICIS data transmission signal. Once receiving a request, the ICIS host transmits the applicable terms and conditions that all users must accept in order to access the ICIS. Once the ICIS host receives indication that the ICIS terms and conditions have been accepted, the ICIS host sends a prompt to the mobile device instructing it to create a personal identification number ("PIN"). Users with a PIN are able to bypass the terms and conditions step on subsequent logins. Next, the ICIS host transmits ICIS user software program to the mobile device to be downloaded and installed. Once the installation is complete, the user can log in to the ICIS host through the locally hosted ICIS data transmission signal through the ICIS software. During the log in process, the phone number or email addresses of the mobile device is temporarily stored in the ICIS computer host. The phone numbers and email addresses are stored in an active roster as long as the corresponding mobile device remains logged on to the ICIS computer host. Once logged in, the locally hosted ICIS data transmission signal transmits local auxiliary data to the mobile device. Upon completion of the auxiliary download, the ICIS main menu is displayed and the mobile device can access all of the services available under the ICIS.

Figure 9:
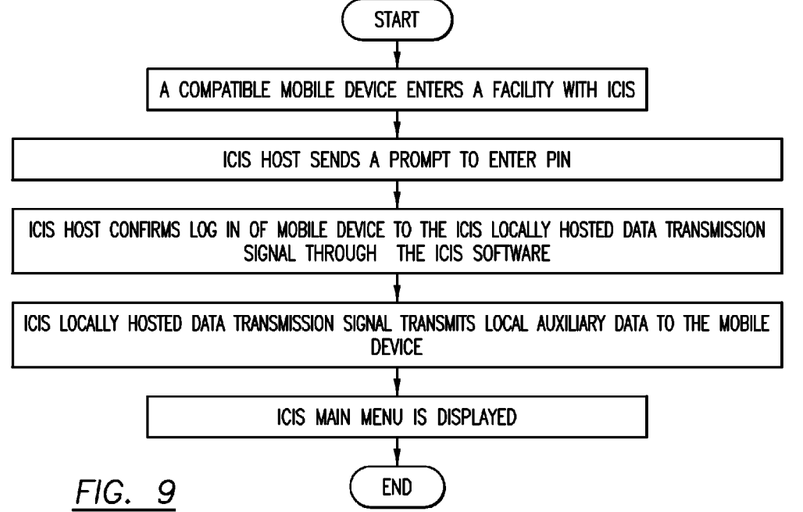
FIG. 9 shows a flow chart showing a process of accessing the ICIS on a device that has accessed the ICIS previously.

Referring now to FIG. 9, when a mobile device that has already registered for ICIS and already has the requisite ICIS user software enters a facility with ICIS, the user accesses the ICIS through the ICIS user software already on the phone. Upon receiving the request from the mobile device, the ICIS host sends a prompt, requiring the user to enter the user's PIN. Once the ICIS host confirms PIN and the log in of mobile device, it transmits through the locally hosted ICIS data transmission signal the local auxiliary data specific to the ICIS facility that is being accessed. Once the mobile device has completed downloading the local auxiliary data, the ICIS main menu is displayed and the mobile device can access all of the services available under the ICIS.

Figure 10:
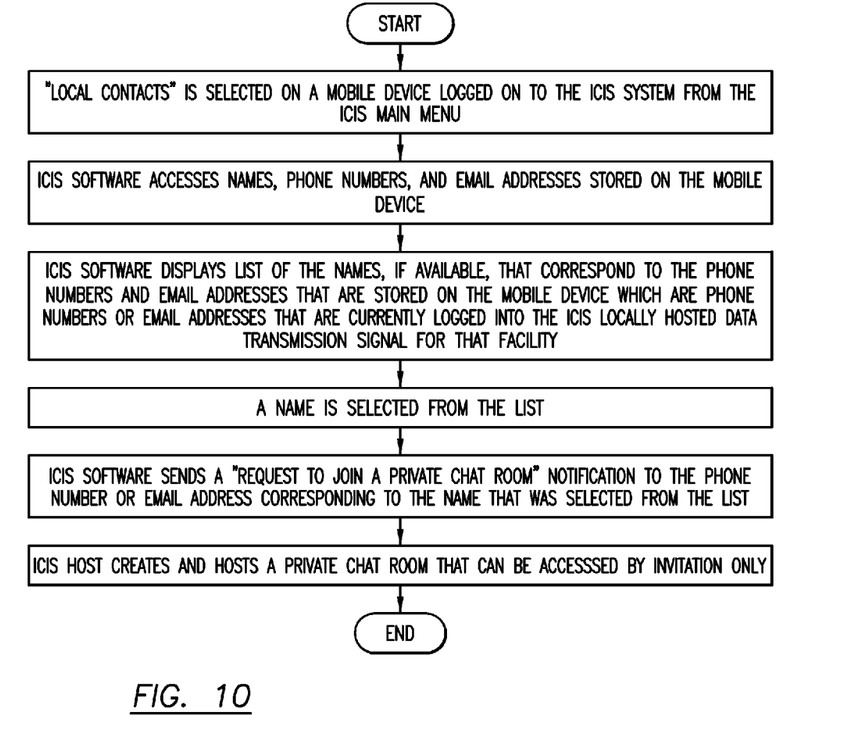
FIG. 10 shows a flow chart showing a process of accessing the ICIS' interpersonal communication service.

Referring now to FIG. 10, the use of the interpersonal communication service is described. From the ICIS Main Menu, a user would select the Local Contacts link. When this link is accessed, the ICIS user software scans the user's mobile device for all phone numbers and email address that are listed in the phone book or contacts section of the mobile device and matches the phone numbers and email addresses to the corresponding name as listed in the mobile device. Next, the ICIS checks the phone numbers and email addresses in the phone against the active roster and displays list of the names whose phone numbers and email addresses as stored on the mobile device currently match a phone numbers or email address that are currently logged into the ICIS locally hosted data transmission signal for that facility. If a name is selected from the list, the ICIS user software sends a prompt though the ICIS computer host to the phone number or email address that corresponds to the selected name. The prompt causes a request to join a private chat room to appear on the mobile device of the selected name. If the request is accepted, the ICIS host creates and hosts a private chat room in which the mobile devices can privately communicate. The ICIS hosted private chat rooms can host two or more people, however, the private chat rooms can be accessed by invitation only.

In an alternate embodiment of the invention, cloud Internet-based computer services could be used. The computer host in the overall invention could be provided using Internet cloud services. A cloud service provider has a server that could act as the computer host off-site and communicate with a local host computer using the Internet. The facility that uses ICIS thus engages a cloud-based service provider to store and maintain the data necessary for ICIS including the necessary software programs to rum ICIS. Thus the host computer at the facility will be connected to the Internet and to the cloud service provider server that maintains ICIS database information and ICIS software. The purpose of this arrangement is to take advantage of the benefits of cloud computing and reducing the system requirements of the host computer at the facilities.

Figure 11:
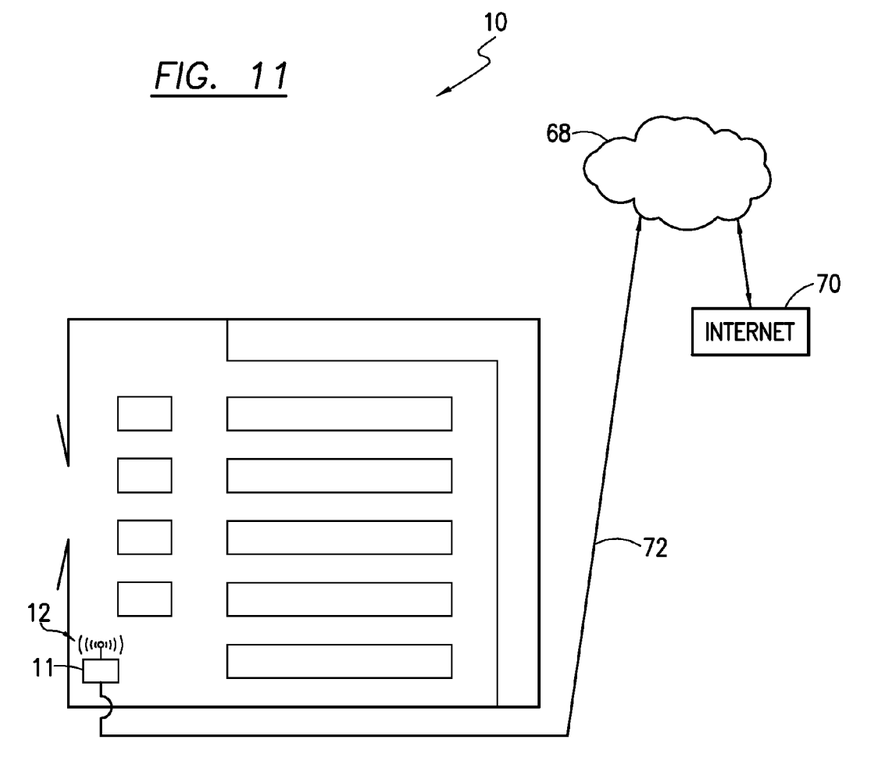
FIG. 11 shows an alternate embodiment of the invention that is a top plan schematic view of a store with the ICIS system installed connected to a cloud computing system and the Internet.

Referring to FIG. 11, an alternate embodiment of the invention is disclosed that allows the facility host computer 11 or other cloud interactive device to be connected to a cloud computer system 68 and to the Internet 70 by any type of Internet connection 72. The cloud computer system 68 can provide the operating software applications for the particular store facility 10 which would include the latest data and shopping information, including pricing for every item in the store facility 10 on every shelf. The cloud computing system 68 can also have a software application to recognize a user account in facility 10 with a smart phone including ICIS software in accordance with the invention. Thus, the facility host computer 11 or other cloud interactive device using its wireless transmission capability 12 can interact with a user ICIS device that provides specific interactive information to a user physically located in facility and that interacts with wireless transmissions and the cloud computer system 68. The computer 11 can be offsite but connected with the router 12 used at the facility 10 to communicate with the smart ICIS device.

Figure 12:
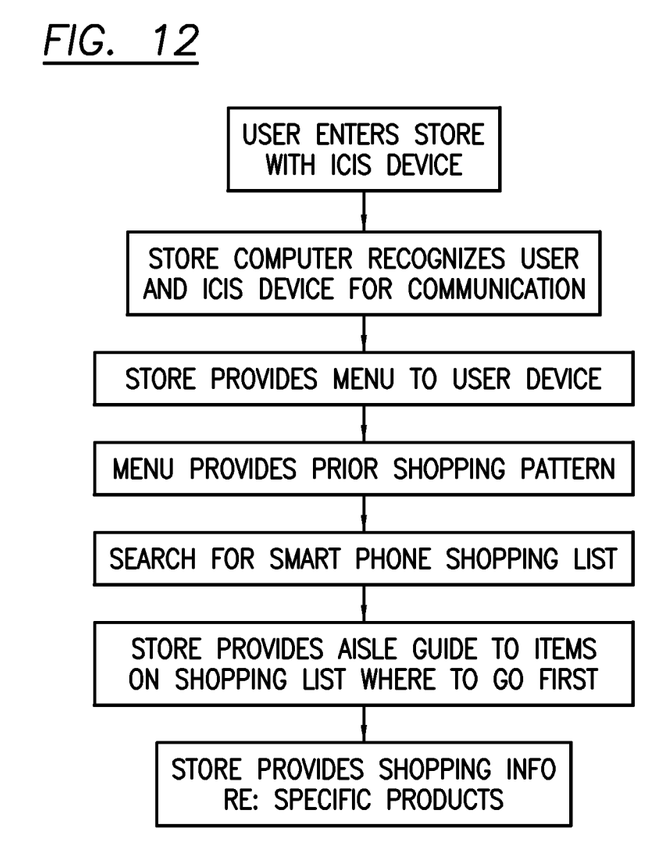
FIG. 12 is a flow chart of an alternate embodiment showing use of the system in a grocery store with a smart communication device.

FIG. 12 is an example of the alternate embodiment of the invention that uses a smart device with ICIS software to provide specific product information to a user including location in the facility store 10. In the first step the user enters a store with a smart ICIS device. The store host computer connected to cloud computing system 68 recognizes the user and the ICIS device and the devices begin to communicate with each other and interact. The facility store 10 can thus provide an electronic menu to the user device or obtain one from the user device if previously used or a prepared shopping list specifically for the facility store. The store facility host computer or cloud interactive device could provide a menu to the user device based on previous user shopping trips with respect to a shopping list. The store facility computer transmissions would also provide a physical description of the location by aisle as a user guide to items that are on the shopping list and where to go in the store aisle first. Along with this, the store facility computer would be providing overall shopping information regarding specific products, pricing, current sales, and a plethora of other information that would be invaluable to the shopper. For example, the store computer database could remind the user that the user has not purchased milk for over a week or other items that are purchased a cyclical basis. The user could scan cookbook recipes into the smart phone and use such recipes in conjunction with the store facility computer and the cloud database to provide the exact location of all the items needed in the recipe. The store could also print out and provide electronically coupons that are available to the specific items on the shopping list. The store could also suggest substitute values and items that are on sale.

In the alternative embodiment shown in FIGS. 11 and 12, the example used is a grocery store. The same type of interactive communication at the customer level in a specific store could also apply to a museum, a convention center having numerous vendor booths, a hardware store, or any store that has a numerous variety of products for sale. The interactivity between the cloud-based computer system and the tremendous data bank available to the store facility as to all of its products in each of its stores coupled with the user smart device could incredibly expedite shopping trips while the same time giving the consumer the best possible bargains while at the same time, the store facility is promoting its products.

The technology described here can work with Wi-Fi and Bluetooth, cellular network, near field communications, internal GPS, QR Reader and with any smart device including phones or tablets. The connections can be between items and the smart device, between different smart devices at the same location, between items through the cloud and back to the smart device. The system can have the ability to have a cellular network with other smart ICIS devices in conjunction with a satellite network of GPS, Wi-Fi, Bluetooth, and near field technology.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for providing a facility-based local network which provides local information and access to a local interpersonal communication service, comprising:
   a cloud computing system;
   a facility computer host connected to the Internet and said cloud computing system;
   one or more participating mobile devices comprising a visual display and adapted to transmit and receive data over a facility hosted data transmission signal;
   the facility hosted data transmission signal enabling the transmission of electronic data wirelessly between the facility computer host and the participating mobile devices;
   the facility hosted transmission signal also enabling the transmission of the electronic data wirelessly between two or more of the participating mobile devices;
   whereby the facility computer host transmits facility-specific auxiliary data to the one or more participating mobile devices over the facility hosted data transmission signal;
   an information and communications software program loaded on the one or more participating mobile devices, whereby the program receives the facility-specific auxiliary data over the transmission signal and provides the one or more participating mobile devices with local and facility information and access to the interpersonal communication service;
   whereby the software program enables the transmission signal to uniquely identify the one or more participating mobile devices;
   whereby the software program enables the one or more participating mobile devices to transmit data over the transmission signal; and
   wherein the local interpersonal communication service enables the participating mobile devices identified by the software program to be visible to other of the participating mobile devices identified by the software program and whereby messages can be sent and received among the participating mobile devices identified by the software program over the facility hosted data transmission signal.

2. The system of claim 1, wherein the software program comprises:
   a graphical user interface;
   one or more interactive services enabled by the facility-specific auxiliary data; and
   a navigable main menu whereby services within the software program are accessed.

3. The system of claim 2, wherein the one or more interactive services enabled by the the facility-specific auxiliary data in the software program comprise:
   interactive local news and events, capable of being displayed by the mobile device;
   an interactive map, comprising a graphical map of the local area, capable of being displayed by the mobile device; and
   an interactive search engine wherein the the facility-specific auxiliary data is capable of being searched by the one or more participating mobile devices with search results displayed.

4. The system of claim 3, wherein the one or more participating mobile devices additionally comprise a GPS device enabled to transmit a location of the one or more participating devices over the facility hosted transmission signal, and wherein the interactive map is capable of displaying a position locator corresponding to the location of the one or more participating devices.

5. The system of claim 1, wherein the facility hosted data transmission signal is a Wi-Fi network.

6. The system of claim 1, wherein the facility hosted data transmission signal is a Bluetooth signal.

7. A method for providing a facility-based local network which provides local information and access to a local interpersonal communication service, comprising the steps of:
   providing a cloud computing system;
   hosting a facility hosted data transmission signal from said cloud computing system and said Internet that enables the transmission of electronic data wirelessly between a facility computer host and one or more participating mobile devices and also enables the transmission of the electronic data wirelessly between two or more of the participating mobile devices, the mobile devices comprising a visual display and adapted to transmit and receive data over the local data transmission signal;
   transmitting, by the facility computer host, facility-specific auxiliary data to the one or more participating mobile devices over the local data transmission signal;

loading an information and communications software program onto the one or more participating mobile devices, whereby the program receives the facility-specific auxiliary data over the transmission signal and provides the one or more participating mobile devices with local and facility information and access to the interpersonal communication service;

whereby the software program enables the transmission signal to identify the mobile device and enables the mobile device to transmit data over the transmission signal and receive data originating locally on the transmission signal; and enabling, by the local interpersonal communication service, the participating mobile devices identified by the software program to be visible to other of the participating mobile devices identified by the software program whereby messages can be sent and received among the participating mobile devices identified by the software program over the facility hosted data transmission signal.

8. The method of claim 7, wherein the software program comprises:

a graphical user interface;

one or more interactive services enabled by the facility-specific auxiliary data; and a navigable main menu whereby services within the software program are accessed.

9. The method of claim 8, wherein the one or more interactive services enabled by the facility-specific auxiliary data in the software program comprise:

interactive local news and events, capable of being displayed by the mobile device;

an interactive map, comprising a graphical map of the local area, capable of being displayed by the mobile device; and an interactive search engine wherein the facility-specific auxiliary data is capable of being searched by the one or more participating mobile devices with search results displayed.

10. The method of claim 9, wherein the one or more participating mobile devices additionally comprise a GPS device enabled to transmit a location of the one or more participating devices over the facility hosted transmission signal, and wherein the interactive map is capable of displaying a position locator corresponding to the location of the one or more participating devices.

11. The method of claim 7 for loading said information and communications software program into a mobile device comprising the steps of:

entering a facility having a facility computer host transmission signal to access a mobile device;

accepting the computer host transmission signals facility's terms and conditions on the mobile device; and downloading and installing the information and communications software program into the mobile device.

12. The method of claim 7, wherein the facility hosted data transmission signal is a Wi-Fi network.

13. The method of claim 7, wherein the facility hosted data transmission signal is a Bluetooth signal.

* * * * *